US005405482A

United States Patent [19]

Morrissette et al.

[11] Patent Number: 5,405,482

[45] Date of Patent: Apr. 11, 1995

[54] LABELING MACHINE

[75] Inventors: Roger J. Morrissette, Enfield; Robert A. Leduc, W. Lebanon, both of N.H.; Dale C. Merrill, White River Jct., Vt.

[73] Assignee: New Jersey Machine, Inc., Lebanon, N.H.

[21] Appl. No.: 145,863

[22] Filed: Nov. 1, 1993

[51] Int. Cl.[6] .......... B32B 31/00

[52] U.S. Cl. .......... 156/364; 156/362; 156/541; 156/542; 156/DIG. 46; 271/176; 271/189; 271/308; 271/310; 271/312; 271/900

[58] Field of Search .......... 156/361, 362, 540, 541, 156/542, DIG. 46; 271/176, 189, 307, 308, 310, 312, 900

[56] References Cited

U.S. PATENT DOCUMENTS

| | | | |
|---|---|---|---|
| 2,551,364 | 5/1951 | Coakley | 271/57 |
| 2,806,621 | 9/1957 | Drennan | 216/64 |
| 3,779,829 | 12/1973 | Wolff | 156/361 |
| 3,864,187 | 2/1975 | Carter | 156/364 |
| 3,954,542 | 5/1976 | Solomon et al. | 156/360 |
| 4,154,639 | 5/1979 | Totten | 156/364 |
| 4,361,460 | 11/1982 | Kronseder | 156/568 |
| 4,370,051 | 1/1983 | Matsuyama et al. | 271/308 X |
| 4,372,681 | 2/1983 | Sallenbach | 156/541 X |
| 4,435,243 | 3/1984 | Azeez et al. | 156/361 |
| 4,662,971 | 5/1987 | Adams | 156/270 |
| 4,842,660 | 6/1989 | Voltmer et al. | 156/361 X |
| 5,300,160 | 4/1994 | Wilson et al. | 156/64 |

FOREIGN PATENT DOCUMENTS

| | | | |
|---|---|---|---|
| 0255350 | 11/1987 | Japan | 271/308 |

*Primary Examiner*—David A. Simmons
*Assistant Examiner*—Paul M. Rivard
*Attorney, Agent, or Firm*—Samuels, Gauthier & Stevens

[57] ABSTRACT

A labeling machine in which pressure sensitive adhesively backed labels are releasably adhered to a backing strip moving along a path from a dispensing roll to a take-up roll. The labels are removed from the backing strip onto a rotating applicator drum at a first station along said path, and the thus removed labels are transferred from the applicator drum to articles being successively presented at a second station. The improvement comprises a scanning unit, a comparator unit, and a removal unit. The scanning unit is positioned in advance of the first station for reading indicia appearing on the labels adhered to said backing strip. The comparator unit is associated with the scanning unit for comparing the indicia on the labels with a preselected standard and for generating a control signal in the event of a mismatch between the standard and the indicia appearing on an incorrect label. The removal unit is responsive to the control signal for removing the incorrect label from the applicator drum at a location intermediate the first and second station.

13 Claims, 2 Drawing Sheets

LABELING MACHINE

BACKGROUND OF THE INVENTION

The invention relates to labeling machines in which labels are transferred from continuously moving backing strips via rotating applicator drums to articles such as food or medicine containers being conveyed through a labeling station. The invention is concerned in particular with preventing incorrect labels from being applied to such containers, with minimal attendant interruption of machine operation.

Packagers of foods and pharmaceuticals demand high levels of accuracy and reliability in the labelling process. Accordingly, systems have been developed for detecting the presence of incorrect labels both prior to and following label application. Generally, labeling machines that provide labeling error detection prior to the application of the labels onto the articles, are preferred to those which provide error detection following application. Labeling machines that provide labeling error detection prior to application include those disclosed in U.S. Pat. Nos. 2,551,364 (Coakley) and 4,662,971 (Adams).

The devices of Coakley halt the operation of the machine in the event that an incorrect label is detected. Although this may prevent the application of an incorrect label to an article, the attendant disruption of production adversely affects operating efficiencies.

The Adams reference discloses a device that closes a vacuum line to a rotating vacuum applicator drum in the event that an incorrect label is detected. With the vacuum line closed, the rotating drum is apparently unable to draw the label from the backing strip, and consequently the label is not applied to an article.

Interrupting the vacuum is not, however, an optimal approach for preventing the application of an incorrect label. First, vacuum interruption may not occur sufficiently quickly. Thus, unless the labels are spaced relatively far apart on the backing strip, more than a single defective label (and thus more than the one respective article) could be affected as the drum continues to rotate. Second, it may not be possible to reinstate the vacuum within the drum and resume normal operation without further attendant and disruptive delays.

There is a need therefore for labeling machines that reliably and efficiently prevent incorrect labels from being applied to articles, with minimal interruption of the labeling operation.

SUMMARY OF THE INVENTION

The invention relates to labeling machines in which pressure sensitive adhesive labels are transferred from continuously moving backing strips to articles via rotating vacuum-activated applicator drums. Labeling machines of the invention include a scanning unit for scanning labels on the backing strip, a comparator for comparing the scanned information with a preselected standard, and a removal unit for removing incorrect labels from the applicator drum. In a preferred embodiment the removal unit includes a freely rotating contact wheel mounted on a spring loaded pneumatic cylinder.

DETAILED DESCRIPTION OF THE INVENTION

Figure 1:
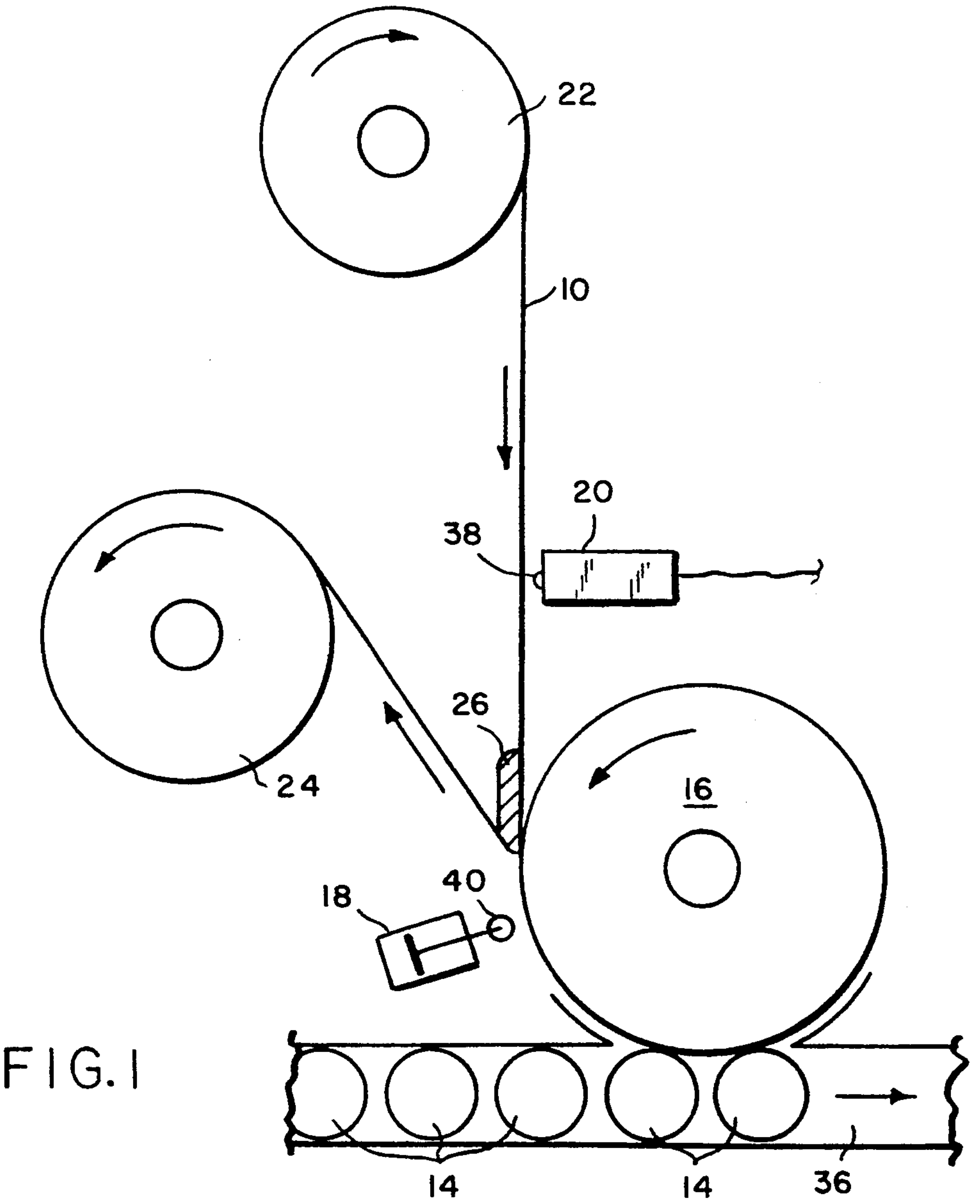
FIG. 1 is a schematic plan view of a labeling machine of the present invention.

As shown in FIGS. 1 through 5, a preferred embodiment of the invention generally includes a backing strip 10 (such as a release material) from which labels 12 are transferred to articles 14 (such as bottles) via a rotating vacuum applicator drum 16. A label removal unit 18 is provided for contacting the labels 12 on the drum 16 responsive to the output of a label scanning unit 20.

Figure 2:
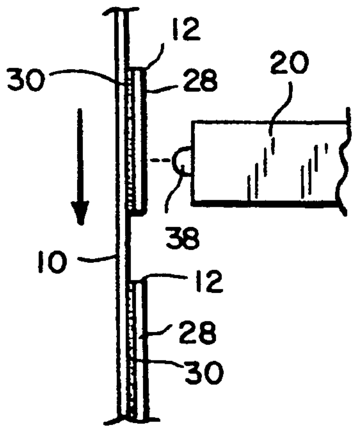
FIG. 2 is a schematic plan view on an enlarged scale of the label scanning unit of the machine shown in FIG. 1.
Figure 3:
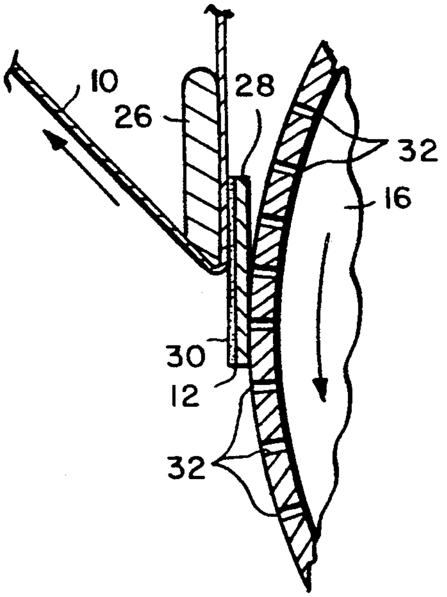
FIG. 3 is a schematic partial view in cross section showing a label being transferred from the backing strip to the rotating vacuum applicator drum.
Figure 4:
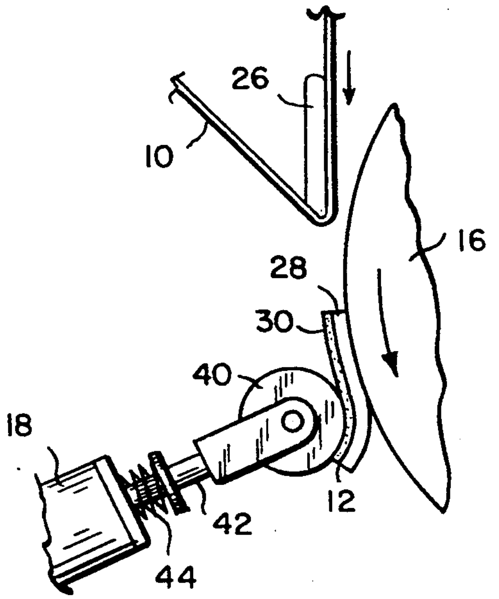
FIG. 4 is a schematic view showing an incorrect label being removed from the vacuum applicator drum by the label removal unit.

The backing strip 10 is unwound continuously from a dispensing roll 22 and subsequently rewound on a take-up roll 24. The backing strip 10 passes near the scanning unit 20 (as shown in FIGS. 1 and 2) and is drawn around a peel plate 26 (as shown in FIGS. 1, 3 and 4). The labels 12 include indicia bearing top surfaces 28 and adhesive coatings 30 on their bottom surfaces by which they are adhered in a longitudinally spaced relationship along the backing strip 10 as shown in FIG. 2. The labels 12 are releasably adhered to the backing strip 10 such that as the backing strip 10 passes around the peel plate 26 (as shown in FIG. 3), the leading portions of the labels 12 separate from the backing strip 10.

Figure 5:
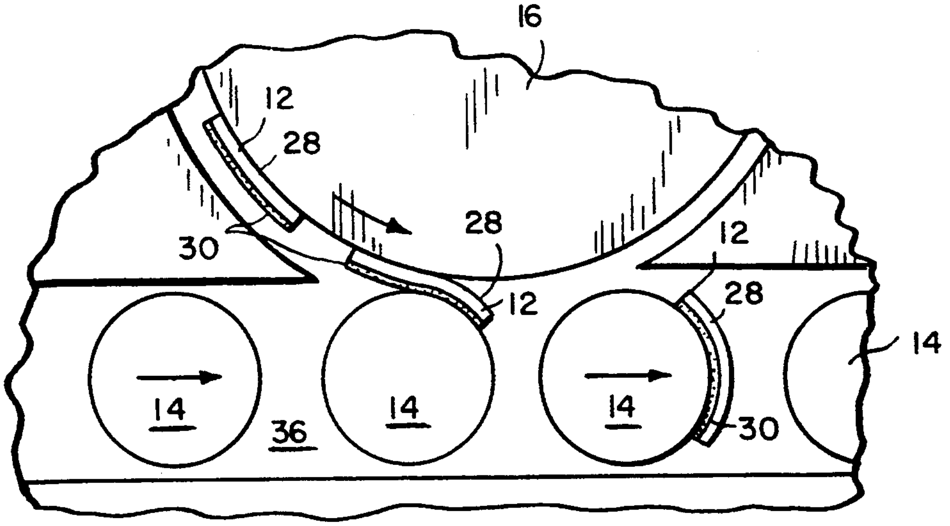
FIG. 5 is a schematic view showing a label being transferred from the applicator drum to an article.

As shown in FIG. 3, the rotating vacuum applicator drum 16 is hollow and includes numerous openings 32 in its outer wall 34. A vacuum is maintained internally in the drum 16 by conventional means (not shown) well known to those skilled in the art. The vacuum force holds the labels 12 against the drum 16 through the openings 32 as the labels separate from the backing strip 10. The top surfaces 28 of the labels 12 face the drum surface, leaving the adhesive coatings 30 exposed. Unless the scanning unit 20 detects an incorrect label, the labels 12 are sequentially transferred via the rotating drum 16 to articles 14 proceeding along conveyor 36 as shown in FIGS. 1 and 5. The adhesive strength of the coatings 30 overcomes the vacuum strength of the drum 16 and the labels 12 are successively pulled from the drum 16 and applied to the articles 14.

The label scanning unit 20 detects the presence of incorrect labels by comparing the output of a sensor 38 with a predetermined standard as the labels 12 pass before the sensor 38 and are thereby scanned. The sensor 38 is positioned to scan light reflected from indicia on the top surfaces 28 of the labels 12. Such indicia may include bar codes or any other pattern to be recognized or compared with a predetermined standard. In alternative embodiments the scanning unit 20 may include a camera together with an image processing system, or may include an ultraviolet light detection system. The scanning unit 20 in turn produces an output signal indicative of the presence of an incorrect label 12. Once a label has been identified as being incorrect, this information is stored in a controller for later use in connection with the label removal unit 18.

As shown in FIG. 4, the label removal unit 18 includes a freely rotating removal roller 40 mounted on the end of the piston rod 42 of a double acting pneumatic cylinder. Although the cylinder is separately driven in each direction to provide optimally fast response times, the cylinder is spring biased by spring 44 in the extended position to ensure that the roller 40 will contact the drum 16 in the event of a power failure. The piston rod 42 is pneumatically retracted against the biasing force of the spring 44 to allow acceptable labels to pass by the roller 40 and remain on the drum 16 until they encounter and are transferred onto the articles 14.

The movement of the labels 12 through the machine is monitored either through the use of one or more indexing sensors (such as edge detection sensors), or through the use of a timer. Edge detection sensors detect leading and/or trailing edges of labels 12 as they move along either the backing strip 10 or the rotating drum 16. Alternatively, timers may be used to monitor the movement of the labels 12 under conditions of known speeds.

In a preferred embodiment, the sensor 38 on the scanner unit 20 also detects the trailing edges of the label 12 as they move along the backing strip 10. The number of labels along the path between the scanning unit 20 and the removal unit 18 is programmed into the controller. The relative positions of the units 18 and 20 may be adjusted, and the number of labels in this path is, for example, four. Accordingly, it may be determined that once an incorrect label has been identified, and after the edge detector has subsequently sensed the passage of three trailing edges (from three labels), then the incorrect label will be positioned immediately before the removal unit 18. In alternative embodiments, indexing sensors may be positioned either on, or in close proximity to, the label removal unit itself.

Specifically, in the present embodiment, if a label is identified by the scanning unit 20 as being incorrect, then a signal is recorded in a shift register within a programmable logic controller. As the edge sensor detects the trailing edges of subsequent labels, the shift register counts the number of labels which pass before the edge sensor. After the predetermined number of labels (e.g., three) have passed the edge sensor following the identification of an incorrect label, the piston rod 42 is advanced, causing the roller 40 to contact the incorrect label on the drum 16. The piston rod 42 is retracted (removing the roller 40 from the drum 16) in response to the detection of the trailing edge of the fourth label passing by the scanning unit 20. This ensures that the roller 40 will begin rolling prior to contacting the incorrect label, and that the roller 40 will contact the entire length of the incorrect label. The adhesive strength of the coating 30 overcomes the vacuum strength of the drum 16 and the incorrect label is wrapped around the removal roller 40.

In an alternative embodiment particularly suited for high speed operation, the amount of time taken for a label to move from the scanning unit 20 to the removal unit 18 is programmed into the controller. Accordingly, once an incorrect label is identified, the controller causes the removal unit to contact the drum precisely as the incorrect label passes before the removal roller 40. The controller must anticipate the positioning of the label and advance the piston rod 42 before the incorrect label actually reaches the removal unit 18. This embodiment may also permit automated adjustment of this delay time responsive to changes in the speed of rotation of the drum. Additionally, the removal unit may further include a drive motor for rotatably driving the removal wheel at high speeds (faster than the drum) to ensure that the desired (incorrect) label is the only label removed from the drum. The cylinder extension and duration times may also be adjusted to allow for a variety of label lengths and operating speeds.

The biasing spring 44 of the piston rod 42 ensures that the roller 40 will contact the incorrect label on the drum 16 with sufficient force to remove the label in the event that the piston rod 42 is not properly pneumatically charged. In a preferred embodiment, the roller 40 is not retracted between removing successive labels that are identified as incorrect. The removed labels will accumulate on the removal roller 40 and eventually must be removed from the roller 40 by a machine operator.

The improved labeling machine of the invention prevents incorrect labels from being applied to articles, and achieves this with little or no loss in operating time. Unlabeled bottles are easily thereafter identified by operating personnel and may even be reused. It is appreciated by those skilled in the art that numerous modifications may be made to the above embodiments without departing from the scope of the invention.

We claim:

1. In a labeling machine wherein pressure sensitive adhesively backed labels are releasably adhered to a backing strip moving along a path from a dispensing roll to a take-up roll, the labels are removed from the backing strip onto a rotating applicator drum at a first station along said path, and the thus removed labels are transferred from the applicator drum to articles being successively presented at a second station, the improvement comprising:

scanning means in advance of said first station for reading indicia appearing on the labels adhered to said backing strip;

comparator means associated with said scanning means for comparing the indicia on said labels with a preselected standard and for generating a control signal in the event of a mismatch between said standard and the indicia appearing on an incorrect label; and removal means responsive to said control signal for removing said incorrect label from said applicator drum at a location intermediate said first and second station.

2. A labeling machine as claimed in claim 1, wherein said removal means includes a freely rotating contact unit for contacting said incorrect label.

3. A labeling machine as claimed in claim 1, wherein said removal means includes a rotationally driven contact unit for contacting said incorrect label.

4. A labeling machine as claimed in claim 1, wherein said removal means includes a pneumatic cylinder.

5. A labeling machine as claimed in claim 1, wherein said removal means includes a biasing spring for urging a contact unit against said applicator drum.

6. A labeling machine as claimed in claim 1, wherein said machine further includes timing means for producing a delay signal and wherein said removal means is responsive to said delay signal.

7. A labeling machine as claimed in claim 6, wherein said timing means automatically adjusts said delay signal responsive to changes in the speed of rotation of the drum.

8. A labeling machine as claimed in claim 1, wherein said machine further includes indexing means for monitoring the positions of said labels between said first and second stations.

9. A labeling machine as claimed in claim 8, wherein said indexing means includes an edge detection sensor for detecting the trailing edges of said labels.

10. A labeling machine as claimed in claim 9, wherein said removal means is responsive to the detection of a trailing edge of a label at said edge detection sensor.

11. A labeling machine as claimed in claim 1, wherein said applicator drum is a vacuum drum.

12. A labeling machine wherein labels are transferred from a backing strip to articles via a rotating applicator drum, said machine comprising:

sensor means for generating a sensor signal responsive to the presence of certain indicia on said labels when said labels are on said backing strip;

comparator means for comparing said sensor signal with a predetermined standard and for producing a comparator signal; and removal means for removing said labels from said drum responsive to said comparator signal.

13. A method of preventing the transfer of labels from a backing strip to articles via a rotating applicator drum, said method comprising the steps of comprising:

generating a sensor signal responsive to the presence of certain indicia on said labels when said labels are on said backing strip;

comparing said sensor signal with a predetermined standard;

producing a comparator signal indicative of whether a label complies with the standard; and removing noncomplying labels from said drum responsive to said comparator signal.

* * * * *